US009827695B1

(12) United States Patent
Beckenbach

(10) Patent No.: US 9,827,695 B1
(45) Date of Patent: Nov. 28, 2017

(54) METHOD FOR DISPLAYING SCENERY ON A FLOOR MAT OR FLOOR LINER

(71) Applicant: Martin J. Beckenbach, Palmyra, NY (US)

(72) Inventor: Martin J. Beckenbach, Palmyra, NY (US)

(*) Notice: Subject to any disclaimer, the term of this patent is extended or adjusted under 35 U.S.C. 154(b) by 0 days.

(21) Appl. No.: 15/208,246

(22) Filed: Jul. 12, 2016

Related U.S. Application Data

(63) Continuation of application No. 15/184,403, filed on Jun. 16, 2016.

(51) Int. Cl.
| | | |
|---|---|---|
| *B29C 33/38* | (2006.01) |
| *B60N 3/04* | (2006.01) |
| *B29C 67/00* | (2017.01) |
| *B33Y 10/00* | (2015.01) |
| *B33Y 50/02* | (2015.01) |
| *B33Y 80/00* | (2015.01) |
| *B29L 31/30* | (2006.01) |
| *B29L 31/00* | (2006.01) |

(52) U.S. Cl.
CPC ...... *B29C 33/3835* (2013.01); *B29C 33/3842* (2013.01); *B29C 67/0051* (2013.01); *B29C 67/0088* (2013.01); *B33Y 10/00* (2014.12); *B33Y 50/02* (2014.12); *B33Y 80/00* (2014.12); *B60N 3/044* (2013.01); *B60N 3/048* (2013.01); *B29L 2031/3017* (2013.01); *B29L 2031/757* (2013.01)

(58) Field of Classification Search
CPC . B60N 3/048; B29C 33/3842–33/3892; B29C 33/42; B29C 2033/38
See application file for complete search history.

(56) References Cited

U.S. PATENT DOCUMENTS

| | | | |
|---|---|---|---|
| 2,005,659 A | 6/1935 | Matteson | |
| 3,390,912 A | 7/1968 | Stata | |
| 4,835,030 A * | 5/1989 | Squier | B29C 65/02 156/242 |
| 6,605,333 B2 | 8/2003 | Ferreira et al. | |

(Continued)

FOREIGN PATENT DOCUMENTS

JP S61222832 10/1986

OTHER PUBLICATIONS

"All-Weather Floor Mats" www.scion.com http://www.scion.com/cars/FR-S2014/accessories/#accessory=interiorAll-Weather-Floor-Mats&category=viewAll&view=grid (Accessed Dec. 4, 2014).

(Continued)

*Primary Examiner* — Benjamin Schiffman
(74) *Attorney, Agent, or Firm* — Bond Schoeneck & King, PLLC; Jonathan Gray

(57) ABSTRACT

A method for forming a scene into a floor mat or floor liner, comprising the steps of: receiving a digital image comprised of a plurality of pixels, each pixel having an initial pixel value and a relative position in the digital image; assigning either a first value or a second value to each pixel according to the initial pixel value of each pixel; creating a mold having a surface with a plurality of raised portions, wherein the relative shape, dimension, and position of each raised portion, with respect to each other raised portion, is defined by the relative position, within the digital image, of at least one pixel having the assigned first value.

6 Claims, 3 Drawing Sheets

(56) References Cited

U.S. PATENT DOCUMENTS

| | | | |
|---|---|---|---|
| D479,081 S | 9/2003 | Wildstein et al. | |
| D487,042 S | 2/2004 | Hussaine et al. | |
| 6,783,829 B2 | 8/2004 | Arena | |
| 6,794,013 B1 | 9/2004 | Iacovelli et al. | |
| D562,751 S | 2/2008 | Lu | |
| D584,671 S | 1/2009 | Hsu | |
| 7,824,590 B2* | 11/2010 | Wilde | B41M 3/006 264/129 |
| D666,951 S | 9/2012 | Lu | |
| D698,718 S | 2/2014 | Kingsbury et al. | |
| 8,685,516 B2 | 4/2014 | Gifford et al. | |
| 8,899,655 B1 | 12/2014 | MacNeil et al. | |
| 2002/0018908 A1* | 2/2002 | Smith | B21B 1/227 428/600 |
| 2005/0191459 A1 | 9/2005 | Ferreira et al. | |
| 2006/0088703 A1* | 4/2006 | Landy | B32B 1/04 428/204 |
| 2008/0033593 A1* | 2/2008 | Dufort | A23G 3/28 700/197 |
| 2010/0023155 A1* | 1/2010 | Conrad | B29C 33/3835 700/119 |
| 2013/0020828 A1 | 1/2013 | Gifford et al. | |
| 2013/0161863 A1 | 6/2013 | MacNeil et al. | |
| 2013/0264839 A1 | 10/2013 | Stimel, Jr. et al. | |
| 2014/0314896 A1* | 10/2014 | Sutton | B29C 33/3842 425/385 |

OTHER PUBLICATIONS

Get your pet their own logo place mat for their water & food bowls www.blog.logoproducts4less.com, http://blog.logoproducts4less.com/blog/tweety-stuff (Accessed Dec. 4, 2014).

"Hello Kitty Universal" pixgood.com http://pixgood.com/hello-kitty-car-mats.html(Accessed Dec. 4, 2014).

"Stormtrooper Floor Mat" www.mycoolcarstuff.com http://www.mycoolcarstuff.com/products/344-star-wars-stormtrooper-floor-mat.aspx (Accessed Dec. 4, 2014).

"4 pc Marvel Punisher Black White Skull Logo Front Rear Rubber Floor Mats Set New" www.amazon.com, http://www. amazon.com/Marvel-Punisher-Black-WhiteRubber/dp/B00J42BYDM/ref=sr_1_8?s=automotive&ie=UTF8&qid=1417724028&sr=1-8&keywords=automotive+floor+mat (Accessed Dec. 4, 2014).

* cited by examiner

METHOD FOR DISPLAYING SCENERY ON A FLOOR MAT OR FLOOR LINER

CROSS-REFERENCE TO RELATED APPLICATIONS

This application is a continuation of and claims priority to co-pending U.S. patent application Ser. No. 15/184,403, filed on Jun. 16, 2016 and titled "Method for Displaying Scenery on a Floor Mat or Floor Liner," the entire disclosure of which is incorporated herein by reference.

BACKGROUND OF THE INVENTION

1. Field of the Disclosure

The present invention relates to floor mats or floor liners and, more particularly, to floor mats or floor liners that depict scenery.

2. Description of the Related Art

Rubber and plastic floor mats or floor liners have become a nearly ubiquitous automotive accessory and a multi-million dollar industry. The appearance of the mats, however, has remained stagnant—an unchanging slew of mats with little or no design beyond a generic pattern continue to flood the market. Indeed, there has been little progress in developing or changing the appearance of the mat. Accordingly, there exists a need in the art for a method for forming a scene into the floor mat or floor liner in relief.

BRIEF SUMMARY OF THE INVENTION

Accordingly, various embodiments described herein are directed to a method for forming a scene into a floor mat or floor liner in relief.

In an aspect, a method for forming a scene into a floor mat or floor liner comprises the steps of: receiving a digital image comprised of a plurality of pixels, each pixel having an initial pixel value and a relative position in the digital image; assigning either a first value or a second value to each pixel according to the initial pixel value of each pixel; creating a mold having a surface with a plurality of raised portions, wherein the relative shape, dimension, and position of each raised portion, with respect to each other raised portion, is defined by the relative position, within the digital image, of at least one pixel having the assigned first value.

In another aspect, a floor mat or floor liner depicting a scene may comprise a surface having a plurality of raised portions, wherein the relative shape, dimension, and position of each raised portion, with respect to each other raised portion, is defined by the position and value of at least one pixel within a digital image, such that the plurality of raised portions depict at least a portion the digital image in relief.

BRIEF DESCRIPTION OF THE SEVERAL VIEWS OF THE DRAWING(S)

The present invention will be more fully understood and appreciated by reading the following Detailed Description in conjunction with the accompanying drawings, in which.

DETAILED DESCRIPTION OF THE INVENTION

Figure 1:
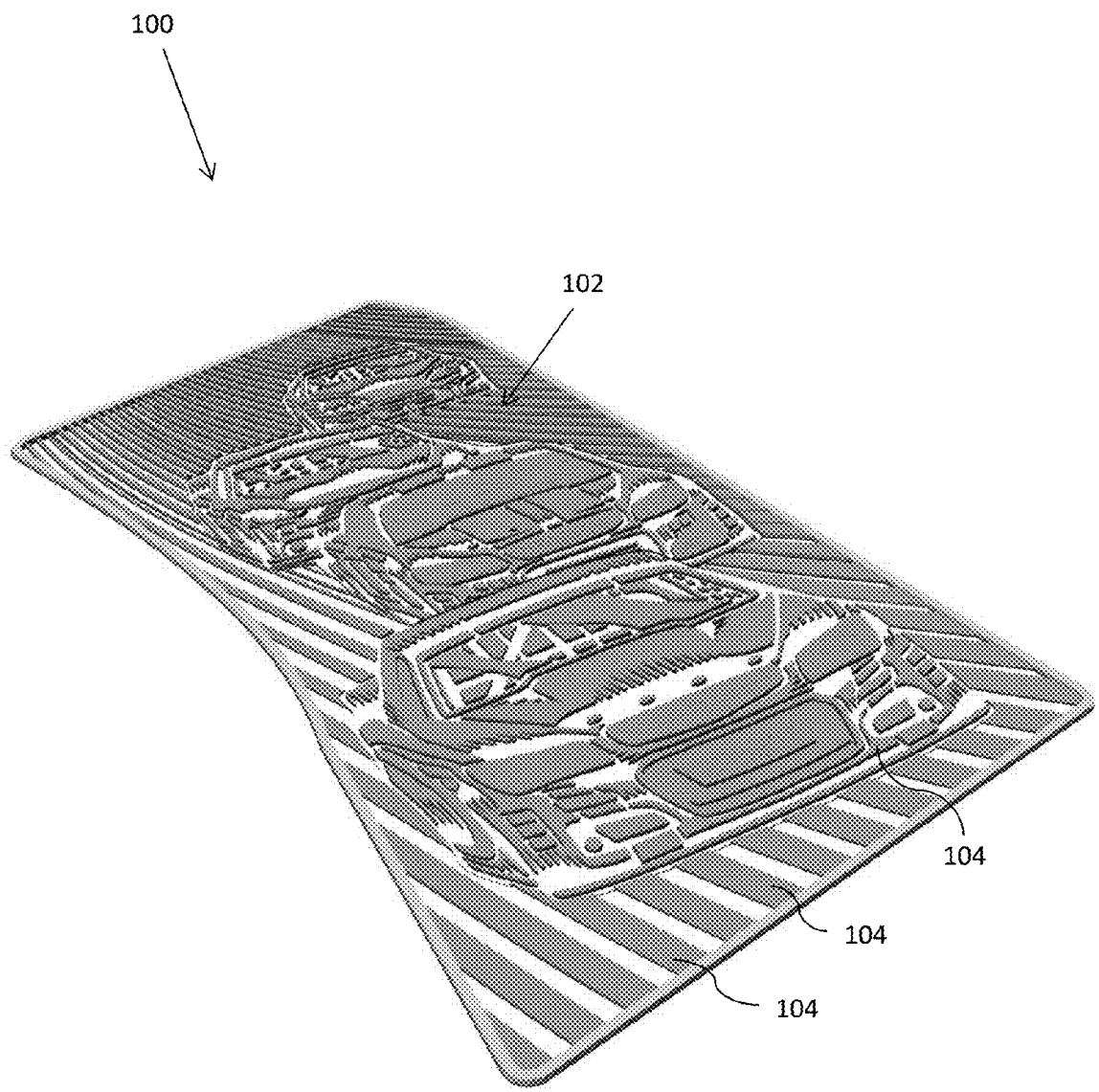
FIG. 1 is a perspective view of floor mat depicting a scene in relief, according to an embodiment.
Figure 2:
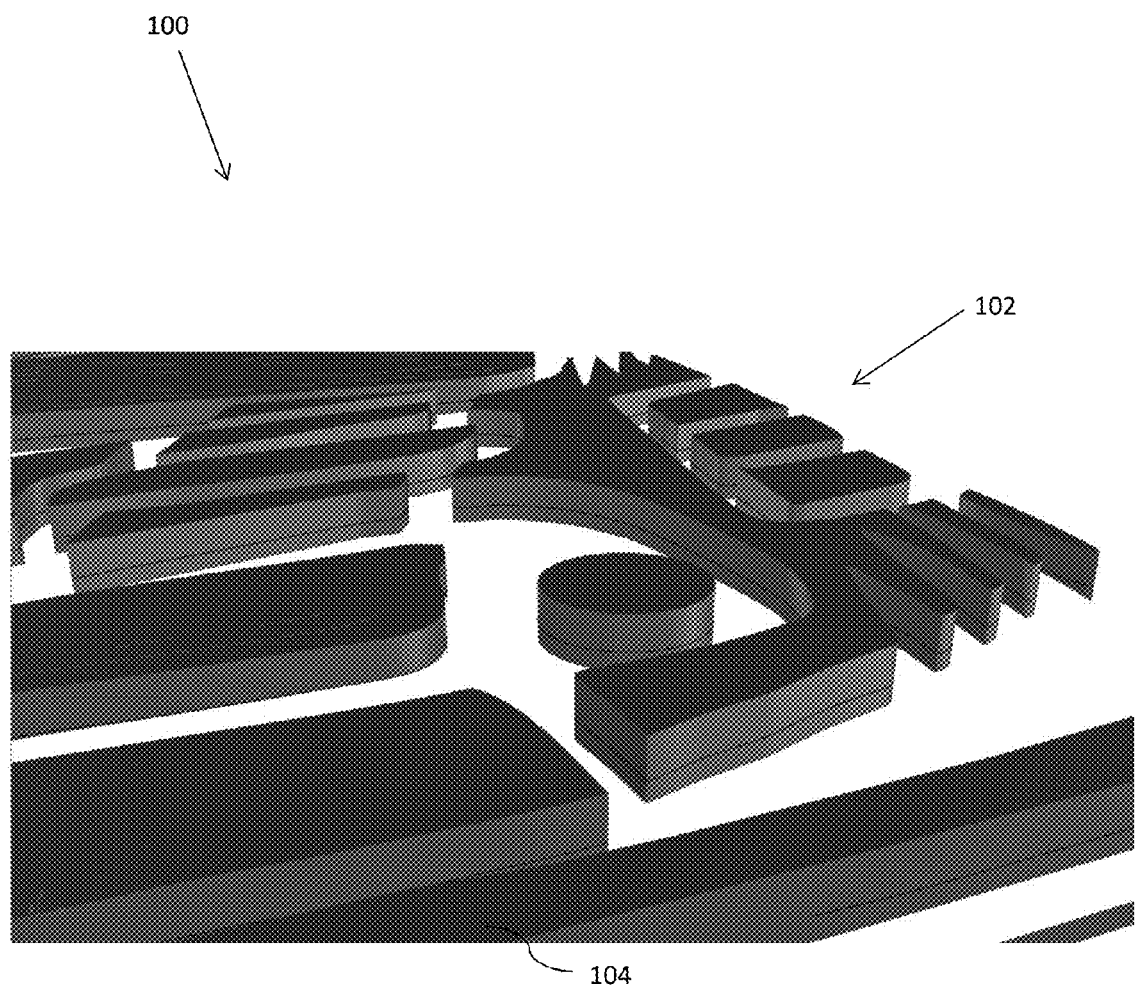
FIG. 2 is a perspective view of a close up of the raised portions of a floor mat depicting a scene in relief, according to an embodiment.

Referring now to the drawings, there is shown in FIG. 1, a floor mat 100 depicting a scene. (In an alternate embodiment, the floor mat 100 may be a floor liner.) The floor mat 100 may have at least one surface 102, having a plurality of raised portions 104. A close-up, three-dimensional view of the raised portions 104 and surface 102 may be scene in FIG. 2. The scene displayed by the floor mat 100 (or floor liner) may correspond to digital image depicting the same or a similar scene. For example, the scene depicted in FIG. 1 of a several race cars may correspond to a digital image similarly depicting the race cars. Thus, the relative shape, dimension, and position of each raised portion 104, with respect to each other raised portion, may defined by the position and value of at least one pixel within a digital image, such that the plurality of raised portions 104 depict at least a portion the digital image in relief. For example, the raised portions 104 that depict the grill of one race car may correspond to a plurality of pixels of a digital image that depict the grill of the same race car. Thus, the shape, dimension, and position of the raised portion(s) 104 that depict the grill of the race car, with respect to the remaining raised portions 104 defining the scene, is/are defined by the position of the pixels, within the digital image, that define the grill of the race car.

Figure 3:
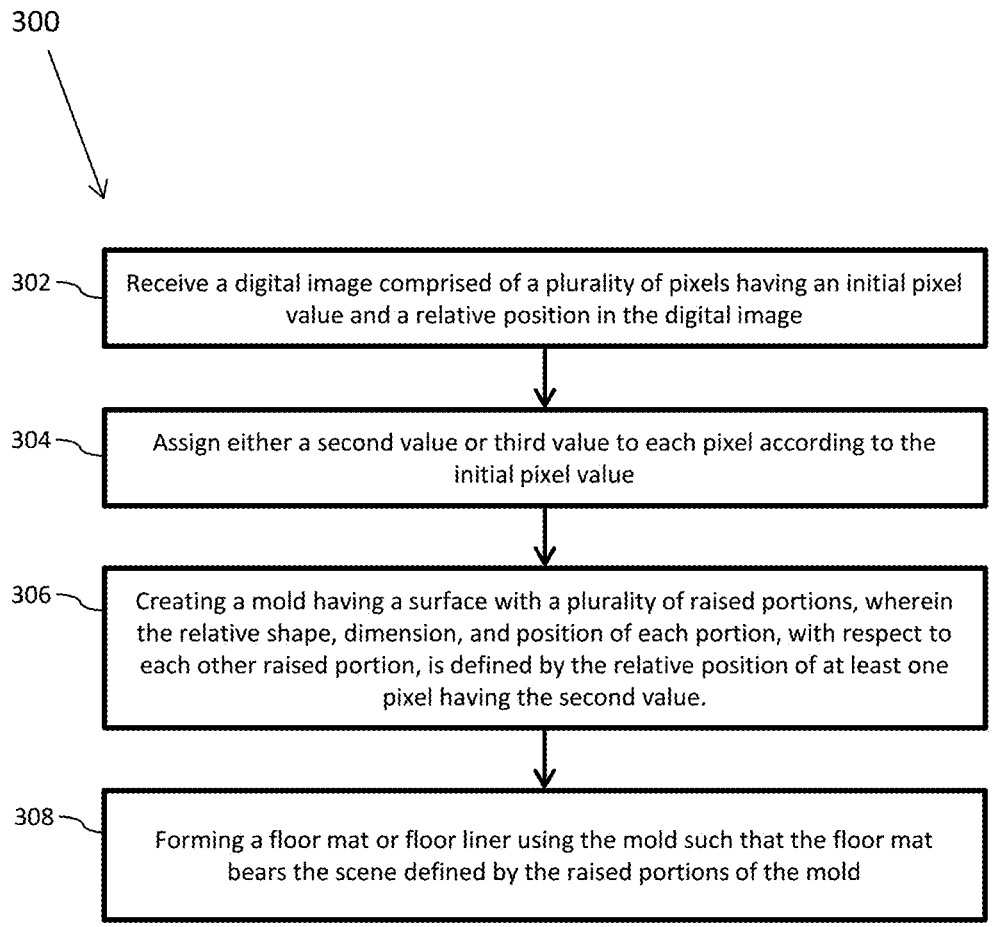
FIG. 3 is a flowchart of a method for forming a scene into a floor mat or floor liner, according to an embodiment.

Turning now to FIG. 3 there is shown a method for forming a scene into a floor mat 100 or floor liner in relief. In step 302, an image is received. The image (with at least respect to the process described in conjunction with FIG. 3) may be drawn or otherwise created by an artist, such as with drawing software, or captured with film or digital photography. The image may depict a scene, such as a race car scene as shown in FIG. 1.

The image may be received as a digital file, or converted into a digital file. The digital file may be comprised of a plurality of pixels, each pixel having an initial pixel value and a relative position in the digital image. For example, the digital file may be an array of values, each value corresponding to a color or lightness or darkness of a pixel, and the location of the pixel with respect to the other pixels, when image is displayed. One of ordinary skill will appreciate (in conjunction with a review of this disclosure) that there are a myriad of ways of storing such data, and that any file format may be used that conveys the value of a pixel and its location within the image.

In step 304, a first value or second value may be assigned to each pixel according to the initial pixel value. In this way, each pixel may be organized into a first category or a second category according to the value of the pixel. For example, if the value of the pixel is above a predetermined lightness threshold, the pixel may be assigned the first value (i.e. organized into a first category). Whereas if the value of the pixel is below the predetermined lightness threshold, the pixel may be assigned the second value (i.e. organized into the second category). Thus if the pixel represents a dark gray, the pixel may be assigned the second value. Alternately, if the ratio of color represented by the pixel (i.e. the ratio of cyan, magenta, and yellow) is light, it may be assigned the first value. Thus a light red (such as a bright pink) may be assigned the first value, whereas a dark red (such as a deep burgundy) may be assigned the second value. Of course, one of ordinary skill will appreciate (in conjunction with a review of this disclosure) the threshold may be varied such that most shades of colors will fall into the first category or the second category. In an alternate embodiment, the pixels may be organized according to other values, such as color, saturation, etc. One of ordinary skill will also appreciate (in conjunction with a review of this disclosure) that the first value may be assigned to the pixels value below a threshold (instead of above). Which category a particular pixel falls may be varied considering the image received and the desired appearance of the final mat.

Furthermore, in an embodiment, the pixels may be assigned their value according to the value of adjacent pixels. For example, if a pixel is a light value (and would be assigned the first value) but all neighboring pixels are a dark value, the pixel may be assigned the second value. Thus, the first or second value may be assigned to each pixel within a region according to an average value or dominant value of the pixels within the particular region. In alternate or additional embodiments, if a group of pixels of one value does not exceed a particular number (with respect to the value of the surrounding pixels) or if the group of pixels does not exceed a particular number in a particular dimension, the pixels may be assigned the value of the surrounding pixels. For example, if, in the middle of a large group pixels having the first value, there exists a group of two pixels of the second value, the pixels may be assigned the second value because the group is not large enough. Also, if, in the middle of group of pixels having the second value, there exists a line of pixels of the first value, only one pixel wide, the pixels may again be assigned the second value because there are not enough pixels in a particular dimension. In this way, small groups of pixels having one value may be removed in favor of larger groups of pixels. This may serve to make the resulting categorization more uniform.

In step 306, a mold may be created having a plurality of raised portions 104. The mold may be created through machining, pouring, etching, or additive manufacturing such as 3D printing. One of ordinary skill appreciate (in conjunction with a review of this disclosure) that a mold may be a dye, form, tool, or any other suitable means for forming a floor mat as described in this disclosure, as is known in the art. In an embodiment, the relative shape, dimension, and position of each raised portion, with respect to each other raised portion, is defined according to the relative position of at least one pixel having the second value. Thus, the resulting mold may have at least one raised portion or portions that convey the image depicted in the original image. In other words, the floor mat 100 or floor liner may depict, in relief (via the raised portions 104), a version of the image depicted in the image received in step 302. Of course, because the pixels have been grouped into at least two categories, the image depicted in relief may be a simplified version of the image received in step 302.

In order to depict the image, the raised portions 104 may map to the pixels of a particular value (i.e. the first or second value). Thus, for example, if the pixels having the first assigned value are grouped into two regions—the regions accordingly having a shape and dimension and position within the image—the raised portions 104 may, proportionally, have the same or a similar shape and dimension relative to the floor mat 100 or floor liner. In this way, the raised portions 104, when viewed against the non-raised portions of the mat 100, may depict the image in relief.

This may be accomplished in one of several ways. For example, the floor mat 100 or floor liner may be divided into a grid (or other coordinate system) wherein each point on the grid may correspond to a pixel or a group of pixels in a particular location on the image. Thus, if the pixel or pixels on that point in the image have the first value (or, alternately, the second value), that grid-point would be raised (or alternately, lowered). This may be accomplished with an etching, 3D printing, or machining device as are known in the art. For example, a CNC device—in an embodiment equipped with an interface for converting the data received from a computer to signals directing the movement of the CNC device—may be employed to machine the lower the portions and form the raised portions 104 of the floor mat 100 or floor liner.

In step 308, the mold created in step 306 may be used to create a floor mat 100 or floor liner. The floor mat 100 or floor liner may be created from a substrate as are known in the art.

In an alternate embodiment, it will be appreciated (in conjunction with a review of this disclosure) that the mold created in step 308 may be a master that would be used to create other molds. To accomplish this, the pixel value that the raised portions 104 are keyed to may be reversed. Thus, if the raised portions 104 are keyed to the pixels having the first assigned value to make a mold, they may instead be keyed to the pixels having the second assigned value. Alternately, what values form the first and second values may be reversed, so that the light values are assigned the second value instead of the first.

In an embodiment, the above steps may be automated and completed by a processor programmed to perform the steps as an algorithm. Thus, in an embodiment, a nontransitory storage medium, together with a mold-machining device (or other mold-making device) may be programmed with an algorithm to perform the steps of: receiving a digital image comprised of a plurality of pixels, each pixel having an initial pixel value and a relative position in the digital image; assigning either a first value or a second value to each pixel according to the initial pixel value of each pixel; and creating a mold having a surface 102 with a plurality of raised portions 104, wherein the relative shape, dimension, and position of each raised portion, with respect to each other raised portion, is defined by the relative position, within the digital image, of at least one pixel having the assigned first value.

The flowcharts/block diagrams in the Figures illustrate the architecture, functionality, and operation of possible implementations of systems, methods, and computer program products according to various embodiments of the present invention. In this regard, each block in the flowcharts/block diagrams may represent a module, segment, or portion of code, which comprises instructions for implementing the specified logical function(s). It should also be noted that, in some alternative implementations, the functions noted in the block may occur out of the order noted in the figures. For example, two blocks shown in succession may, in fact, be performed substantially concurrently, or the blocks may sometimes be performed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for forming a scene into a floor mat or floor liner, comprising the steps of:

receiving a digital image comprised of a plurality of pixels, each pixel having an initial pixel value and a relative position in the digital image;

assigning either a first value or a second value to each pixel according to the initial pixel value of each pixel;

creating a mold having a surface with a plurality of raised portions, wherein a relative shape, dimension, and position of each raised portion, with respect to each other raised portion, is defined by the relative position, within the digital image, of at least one pixel having the assigned first value, wherein at least two raised portions, being respectively defined by the relative positions of two adjacent pixels, are contiguous.

2. The method of claim 1, further comprising the step of forming a floor mat or floor liner with the mold.

3. The method of claim 1, wherein the first value is assigned to each pixel having a relative lightness above a predetermined threshold.

4. The method of claim 3, wherein the first value or second value is assigned according to the initial pixel value of each pixel and the initial pixel values of the pixels adjacent to each pixel.

5. The method of claim 1, wherein the first value is assigned to each pixel having a relative darkness below a predetermined threshold.

6. The method of claim 1, wherein the image is received from a digital camera.

\* \* \* \* \*